Patented Feb. 19, 1952

2,585,909

UNITED STATES PATENT OFFICE 2,585,909

QUATERNARY SALTS OF PYRIMIDYLAMINO-QUINOLINES

Norman Barton, Blackley, Manchester, and Stanley Birtwell, Leeds, England, and Francis Henry Swinden Curd, deceased, late of Blackley, Manchester, England, by Muriel Ruth Curd, executrix, Bramhall, England, assignors to Imperial Chemical Industries Limited, a corporation of Great Britain No Drawing. Application November 3, 1949, Serial No. 125,372. In Great Britain November 5, 1948

12 Claims. (Cl. 260—256.4)

This invention relates to new quinoline derivatives and more particularly it relates to a process for the manufacture of the mono- and di-quaternary salts of pyrimidylaminoquinolines possessing trypanocidal activity.

According to our invention we make the said new compounds, which are of the formula Pq—NH—A wherein P stands for a 2-, 4- (or 6-) amino- or lower alkylamino-substituted pyrimidine nucleus which is attached to the linking —NH— group at another of the 2-, 4- (or 6-) positions and which may be further substituted in the remaining 2-, 4- (or 6-) position by a lower alkyl radical or an amino group or a lower alkylamino group, A stands for Q or Qq, wherein Q stands for a quinoline nucleus which is substituted in the 4-position by an amino group or a lower alkylamino group and which may be further substituted by a lower alkyl group or groups, provided that, if the 4-substituent of the quinoline nucleus be not lower alkylamino then the pyrimidine nucleus must bear a lower alkylamino substituent, and which bears the linking —NH group in the 6-position and the symbols q indicate that the preceding nuclei P and Q respectively, are present in the form of their quaternary salts, by a process which comprises reacting a compound of the formula PqX wherein P and q have the significance stated above and X stands for a halogen atom or the group —SR, wherein R stands for a hydrocarbon radical, with a compound of the formula $NH_2A$ wherein A has the significance stated above.

The starting materials of the formula PqX may be made by a process described in co-pending U. S. application of Ainley, Birtwell and Curd, Serial No. 125,371, filed November 3, 1949, namely by the treatment of the substituted pyrimidine derivative PX with a quaternary salt-forming agent for example methyl iodide, dimethyl sulphate, diethyl sulphate, or methyl p-toluene sulphonate.

The process of the invention may be carried out by heating the reactants together conveniently but not necessarily in a liquid medium and in presence of an acid. Suitable liquid media include for example water and suitable acids include for example hydrochloric acid. The substance $NH_2A$ may, if desired, be used in the form of a salt thereof. The substance $NH_2A$ may, moreover, be added to the reaction mixture in the form of a substance which will give rise to the substance $NH_2A$ under the conditions of reaction, for example, in the form of an acyl derivative thereof.

Some of the new compounds of this invention may be made also by the process of copending U. S. application Ser. No. 125,373, filed November 3, 1949, namely those of the formula Pq—NH—Qq. Although these substances are described and represented herein as di-quaternary salts of pyrimidylaminoquinolines it will be understood that that can also be formulated and named as salts of mono-quaternary salts of dihydropyrimidylaminoquinolines or of pyrimidylaminodihydroquinolines or again as di-salts of dihydropyrimidylaminodihydroquinolines.

The invention is illustrated but not limited by the following examples in which the parts are by weight.

Example 1

13.7 parts of 6-amino-4-methylaminoquinaldine 1-methochloride, 14.3 parts of 4-chloro-2-amino-6-methylpyrimidine 1-methiodide, 350 parts of water and 25 parts of 2N-hydrochloric acid are heated together under reflux for 1 hour and then cooled. The mixture is then filtered and the residue is washed with a little cold water. It is then dissolved in 1000 parts of hot water and an excess of sodium iodide is added. It is then filtered and the residual solid is crystallised from water. There is obtained 4-methylamino - 6 - (2' - amino - 6' - methylpyrimidyl-4'-amino)quinaldine 1:1'-dimethiodide in the form of a pale yellow crystalline power, of M. P. 290° C. (decomp.). The corresponding dimethochloride, M. P. 334° C. (decomp.) may be obtained by heating the dimethiodide in aqueous solution at 80° C. with an excess of freshly prepared silver chloride, filtering, adding sodium chloride to the filtrate, cooling the filtering off the deposited dimethochloride.

Example 2

27.5 parts of 6-amino-4-methylaminoquinaldine 1-methochloride and 38 parts of 4-iodo-2-amino-6-methylpyrimidine 3-methiodide are ground together, 100 parts of water and 50 parts of 2N-hydrochloric acid are added and the mixture heated on the steam-bath for 2 hours. It is then cooled and filtered and the residual solid is washed with cold water. It is then dissolved in hot water, and the solution is cooled to 70° C. and made alkaline to Brilliant Yellow by the addition of aqueous sodium carbonate solution. An excess of sodium iodide is added and the mixture is then filtered and the residual solid is boiled with a little water. The mixture is filtered and the residual solid is crystallised from 50% aqueous alcohol. It is then dissolved in hot N/2 hydriodic acid and allowed to crystallise therefrom. It is then recrystallised from hot water to give small cream-coloured needles which darken on exposure to light and have M. P. 257–258° C. This is 4-methylamino-6-(2'-amino-6'-methylpyrimidyl-4'-amino) quinaldine 1:3'-dimethiodide.

*Example 3*

5.2 parts of 4:6-diaminoquinaldine methochloride hydrochloride are dissolved in 40 parts of water and the solution is added to a boiling solution of 6 parts of 4-chloro-2-methylamino-6-methylpyrimidine 1-methiodide in 40 parts of water. The mixture is boiled for 45 minutes under reflux and is then cooled and filtered. The residual solid is washed with a small quantity of cold water. It is then dissolved in 100 parts of hot water, 20 parts of potassium iodide are added to the solution which is then filtered. The residual solid is recrystallised from water and then consists of 4-amino-6-(2'-methylamino-6'-methylpyrimidyl - 4' - amino) quinaldine 1:1' - dimethiodide, M. P. 304–5° C.

*Example 4*

4.3 parts of 4-methylamino-6-aminoquinaldine are dissolved in 11 parts of hot 7% aqueous hydrochloric acid, and 2.7 parts of 2:6-diamino-4-chloropyrimidine-3-methiodide are added to the solution. The mixture is boiled under reflux for 23 hours, cooled and filtered. The solid is boiled with 100 parts of ethanol, filtered at 60–70° C., the solid is then boiled with 40 parts of water and filtered at 80° C. The solid is then dissolved in 150 parts of hot water and 6 parts of sodium iodide are added to the solution. The mixture is cooled and filtered. The solid is crystallized from 50% aqueous ethanol, giving 4-methylamino - 6 - (2':6' - diaminopyrimidyl-4'-amino)-quinaldine 3'-methiodide hydriodide, M. P. 285° C.

The 4-methylamino-6-aminoquinaldine used as starting material in the above example may be made as follows:

.58 parts of 4-chloro-6-acetylaminoquinaldine, 51 parts of methylamine hydrochloride, 30 parts of caustic soda, and 60 parts of phenol are ground together, stirred and heated at 190° C. for 3 hours. The mixture is then cooled and 460 parts of 8% aqueous sodium hydroxide solution are added to it. It is then filtered, and the residue is washed with water then dissolved in cold 7% aqueous hydrochloric acid and the solution is treated with charcoal and filtered. The filtrate is made alkaline by addition of aqueous caustic soda, and filtered. The residue is washed with water and then crystallized from aqueous ethanol, giving 4-methylamino-6-acetylaminoquinaldine, M. P. 258–259° C.

This 4-methylamino-6-acetylaminoquinaldine is boiled under reflux with 8 parts of 21% hydrochloric acid for 5 hours. The mixture is then made alkaline and filtered. The solid is crystallized from methanol and is 4-methylamino-6-aminoquinaldine, M. P. 210–212° C.

*Example 5*

2.7 parts of 4-methylamino-6-aminoquinaldine methochloride, 2.3 parts of 2-chloro-4-amino-6-methylpyrimidine-1-methiodide, and 10 parts of N-hydrochloric acid are boiled together under reflux for one hour. It is then filtered and boiled with 150 parts of water, treated with charcoal and filtered. Sodium iodide in excess is added to the filtrate and it is allowed to cool and is then filtered. The solid is crystallized from water, giving 4-methylamino-6-(4'-amino-6' - methylpyrimidyl - 2' - amino) quinaldine-1:1'-dimethiodide, M. P. 271° C. (decomp.).

The starting material used in the above example may be made as follows:

9.2 parts of 4-methylamino-6-acetylaminoquinaldine are stirred with 80 parts of nitrobenzene at 100° C. and 5.6 parts of dimethyl sulphate are slowly added.

The mixture is maintained at 100° C. for one hour and then is allowed to cool and is filtered. The solid residue is washed with acetone, then boiled with 28 parts of concentrated hydrochloric acid and 14 parts of water and is allowed to cool and is then filtered and the residue is washed with acetone and crystallized from aqueous alcohol. There is obtained 4-methylamino-6-aminoquinaldine-1-methochloride, M. P. 334° C. (decomp.).

*Example 6*

1.2 parts of 4-ethylamino-6-acetylaminoquinaldine and 1.86 parts of 4-bromo-2-isopropylamino-6-methylpyrimidine 1-methiodide are ground together and then boiled under reflux for 2 hours with 4.8 parts of 21% aqueous hydrochloric acid. The mixture is then cooled and filtered and the residue is washed with cold water and then dissolved in 60 parts of hot water. The solution is treated with charcoal and filtered and 6 parts of sodium iodide are added to the filtrate which is then cooled and filtered. The solid residue is crystallized from 50% aqueous alcohol to give 4 - ethylamino - 6-(2'-isopropylamino-6'-methylpyrimidyl - 4'-amino) quinaldine - 1'-methiodide hydriodide, M. P. 320° C. (decomp.).

The starting material used in the above example may be made as follows:

10 parts of 4-chloro-6-acetylaminoquinaldine, 1 part of copper sulphate pentahydrate, and 40 parts of 50% aqueous ethylamine are heated together in a closed vessel at 135° C. for 16 hours. The mixture is then made alkaline by addition of 8% aqueous caustic soda solution and filtered. The solid is washed with water and crystallized from 50% aqueous alcohol. 4-ethylamino-6-acetylaminoquinaldine is obtained M. P. 251–252° C.

*Example 7*

1.2 parts of 4:6-diaminoquinoline (Simpson, Journal of the Chemical Society, 1948, 1709) are ground with 2.24 parts of 2-methylamino-4-methylthiopyrimidine 1-methiodide, and the mixture is boiled under reflux for 8 hours with 10 parts of cyclohexanol. It is then cooled and filtered. The solid is washed with alcohol then dissolved in 50 parts of hot water, the hot solution is treated with charcoal and filtered and the filtrate is treated with an excess of iodide, cooled and filtered. The solid is crystallized from 50% aqueous alcohol. There is obtained 4-amino-6-(2' - methylaminopyrimidyl - 4' - amino) quinoline 1'-methiodide M. P. 317° C. (decomp.).

*Example 8*

2.05 parts of 4:6 - diamino - 2:3 - dimethylquinoline as monohydrate made by hydrolysis of 4 - amino - 6 - acetylamino - 2:3 - dimethylquinoline) and 3 parts of 4 - chloro - 2 - methyl - amino - 6 - methylprimidine (M. P. 244° C.

decomp., by interaction of 4-chloro-2-methyl-amino-6-methylpyrimidine and methyl iodide) 1-methiodide are ground together and then boiled under reflux with 15 parts of 6.6% aqueous sulphuric acid for one hour. The mixture is then cooled and filtered, the residue is dissolved in 550 parts of hot water, the solution treated with charcoal and filtered hot and to the filtrate 15 parts of sodium iodide are added. The mixture is then cooled and filtered and the solid is crystallized from 50% aqueous ethanol. There is obtained 4 - amino - 2:3 - dimethyl - 6 - (2'-methylamino - 6 - methylpyrimidyl 4' - amino)-quinoline-1'-methiodide hydriodide M. P. 354° C.

Example 9

2 parts of 4-methylamino-6-aminoquinoline 1-methiodide and 1.8 parts of 4-chloro-2-methyl-amino - 6 - methylpyrimidine 1 - methiodide are ground together, 6 parts of N-hydrochloric acid are added, and the mixture is heated on a water-bath for 90 minutes. It is then cooled and filtered. The residue is dissolved in 200 parts of hot water, and the solution is treated with 6 parts of sodium iodide, cooled and filtered. The solid is crystallized from 50% aqueous alcohol and there is obtained 4 - methylamino - 6 - (2'-methylamino - 6' - methylpyrimidyl - 4' - amino) quinoline - 1 - 1' - dimethiodide M. P. 315° C. (decomp.).

The starting material used in the above example may be made as follows:

Ethyl - 4 - hydroxy - 6 - acetylaminoquinoline-2-carboxylate (Kermack and Weatherhead, J. 1940, 1164) is converted to 4-hydroxy-6-acetyl-aminoquinoline-2-carboxylic acid by hydrolysis with aqueous sodium hydroxide. This substance is decarboxylated by boiling in quinoline in the presence of copper bronze and the so-obtained 4-hydroxy-6-acetylaminoquinoline is converted to 4-chloro-6-acetylaminoquinoline by treatment with phosphorus oxychloride.

4 - methylamino - 6 - aminoquinoline - 1-methiodide is obtained from 4-methylamino-6-acetylaminoquinoline by the action thereon of dimethylsulphate in nitrobenzene the product being then hydrolysed and treated with sodium iodide.

Example 10

3.27 parts of 4 - chloro - 2 - isopropylamino - 6-methyl pyrimidine 1-methiodide, 3.15 parts of 4:6-diaminoquinaldine 1-methiodide, 10 parts of water, and 3 parts of concentrated hydrochloric acid are heated together under reflux for 90 minutes and the mixture is then cooled and filtered. The solid is dissolved in hot water and an excess of sodium iodide is added. 4-amino-6-(2'-isopropylamino - 6 - methylpyrimidyl - 4' - amino)quinaldine 1:1'-dimethiodide is filtered off and crystallised from water. It has M. P. 308° C. (decomp.).

Example 11

6.84 parts of 4 - chloro - 2 - n - butylamino - 6-methylpyrimidine 1 - methiodide, 6.3 parts of 4:6-diaminoquinaldine 1-methiodide, 20 parts of water and 6 parts of concentrated hydrochloric acid are heated together under reflux for 90 minutes and then cooled and filtered. The solid is dissolved in hot water and an excess of sodium iodide is added. The mixture is then filtered and the solid 4 - amino - 6 - (2' - n - butylamino-6' - methylpyrimidyl - 4' - amino)quinaldine 1:1'-dimethiodide is crystallised from water and has M. P. 264–266° C.

We claim:
1. Quaternary salts of the pyrimidylamino-quinoline derivative having the general formula:

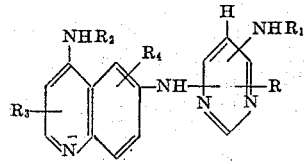

wherein R is a radical from the group consisting of hydrogen, alkyl, amino, and alkyl amino; $R_1$ and $R_2$ are radicals from the group consisting of hydrogen and lower alkyl without $R_1$ and $R_2$ being both simultaneously hydrogen radicals; and $R_3$ and $R_4$ are radicals from the group consisting of hydrogen and lower alkyl.

2. Quaternary salts of the pyrimidylamino-quinoline derivatives having the general formula:

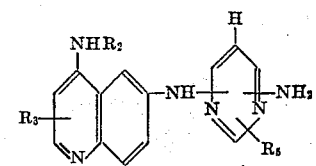

wherein $R_2$, $R_3$ and $R_5$ are lower alkyl radicals.

3. Quaternary salts of the pyrimidylamino-quinoline derivatives having the general formula:

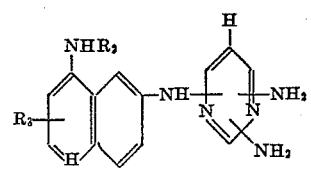

wherein $R_2$ and $R_3$ are lower alkyl radicals.

4. Quaternary salts of the pyrimidylamino-quinoline derivatives having the general formula:

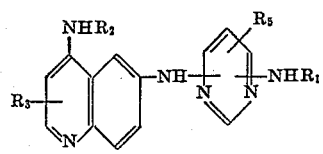

wherein $R_1$, $R_2$, $R_3$ and $R_5$ are lower alkyl radicals.

5. Quaternary salts of the pyrimidylamino-quinoline derivatives having the general formula:

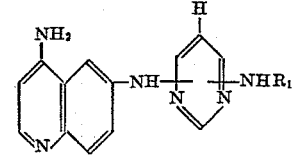

wherein $R_1$ is a lower alkyl radical.

6. Quaternary salts of the pyrimidylamino-quinoline derivatives having the general formula:

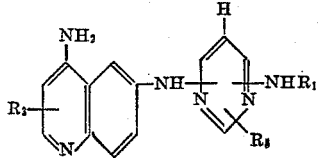

wherein $R_1$, $R_3$ and $R_5$ are lower alkyl radicals.

7. The new quaternary salt, 4-methylamino-6-(2'-amino-6'-methylpyrimidyl-4'-amino) quinaldine-1:1'-dimethiodide.

8. The new quaternary salt, 4-methylamino-6-(2':6'-diaminopyrimidyl-4'-amino) quinaldine-3'-methiodide hydroiodide.

9. The new quaternary salt, 4-ethylamino-6-(2'-isopropylamino-6'-methylpyrimidyl-4'-amino) quinaldine-1'-methiodide hydroiodide.

10. The new quaternary salt, 4-amino-6-(2'-methylaminopyrimidyl-4'-amino) quinoline-1'-methiodide.

11. The new quaternary salt, 4-amino-6-(2'-isopropylamino-6-methylpyrimidyl-4'-amino) quinaldine-1:1'-dimethiodide.

12. A process for the manufacture of quaternary salts as defined in claim 5 which comprises reacting a compound from the group consisting of the mono-quaternary salts and free base form of pyrimidine having the formula:

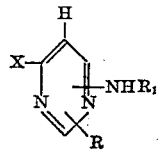

wherein X is a radical from the group consisting of halogen and —S alkyl, R is a radical from the group consisting of hydrogen, amino and lower alkyl and $R_1$ is a radical from the group consisting of hydrogen and lower alkyl, with a material from the group consisting of the mono-quaternary salts and free base form of the quinoline derivative having the formula:

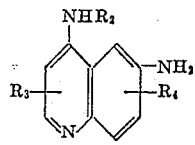

wherein $R_2$, $R_3$ and $R_4$ are radicals from the group consisting of hydrogen and lower alkyl.

NORMAN BARTON.
STANLEY BIRTWELL.
MURIEL RUTH CURD,
Executrix of the estate of Francis Henry Swinden Curd, deceased.

No references cited.